Aug. 20, 1968          R. E. DINE          3,398,276
           MARSHALLING YARD APPARATUS
Filed May 27, 1965                    5 Sheets-Sheet 2
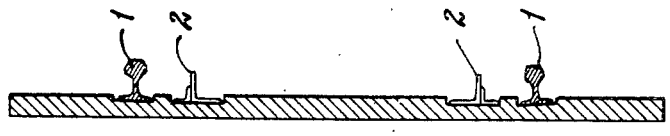
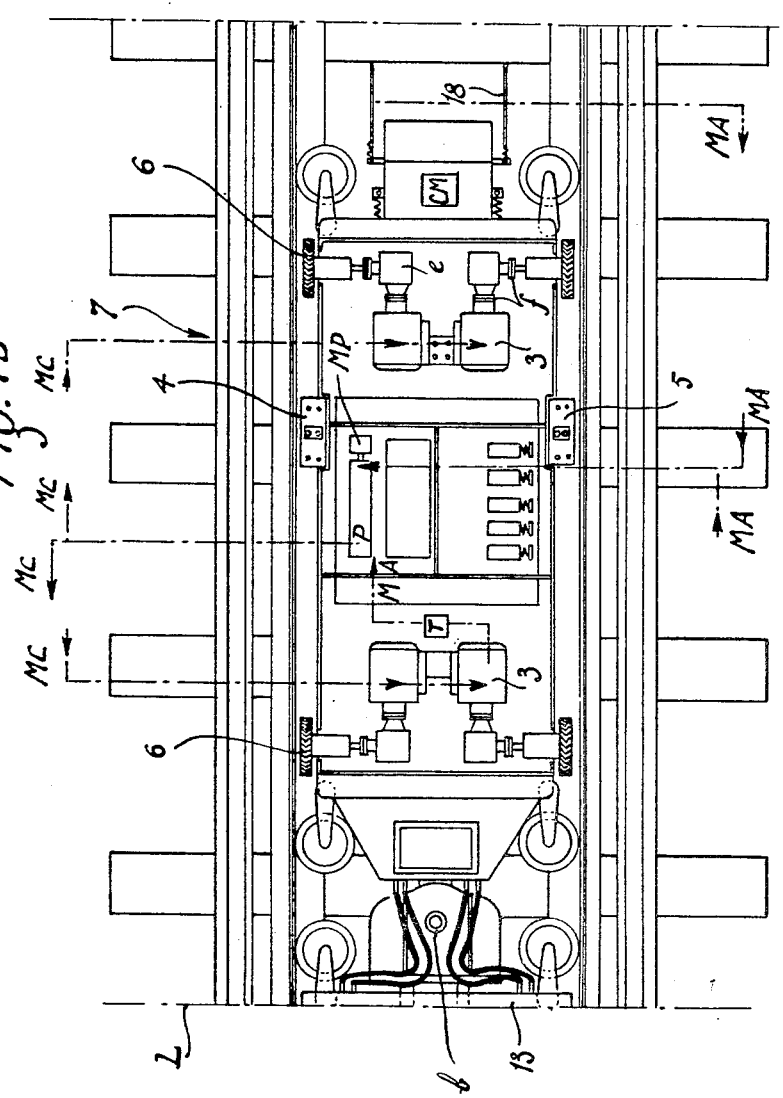
INVENTOR
RENÉ EDOUARD DINE
By Young & Thompson
    ATTYS.

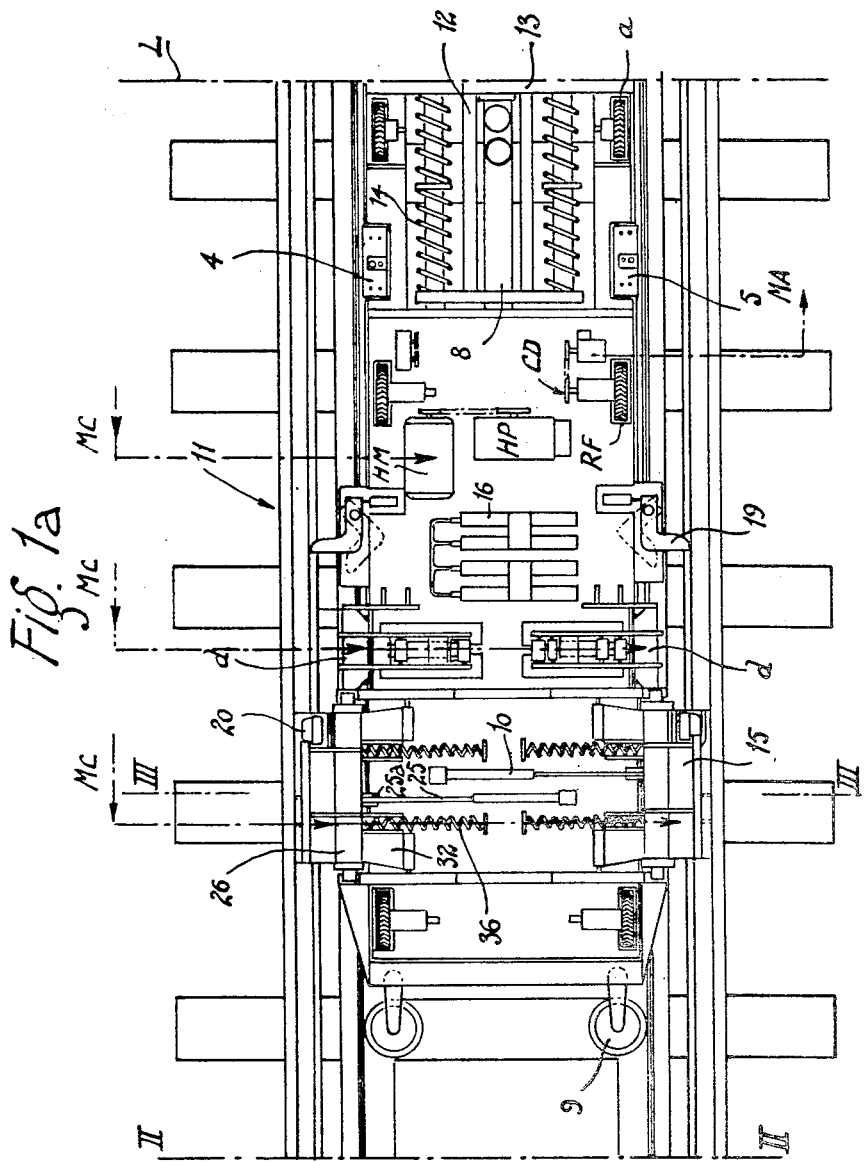

Aug. 20, 1968   R. E. DINE   3,398,276
MARSHALLING YARD APPARATUS
Filed May 27, 1965   5 Sheets-Sheet 3

INVENTOR
RENÉ EDOUARD DINE
By Young & Thompson
Attys.

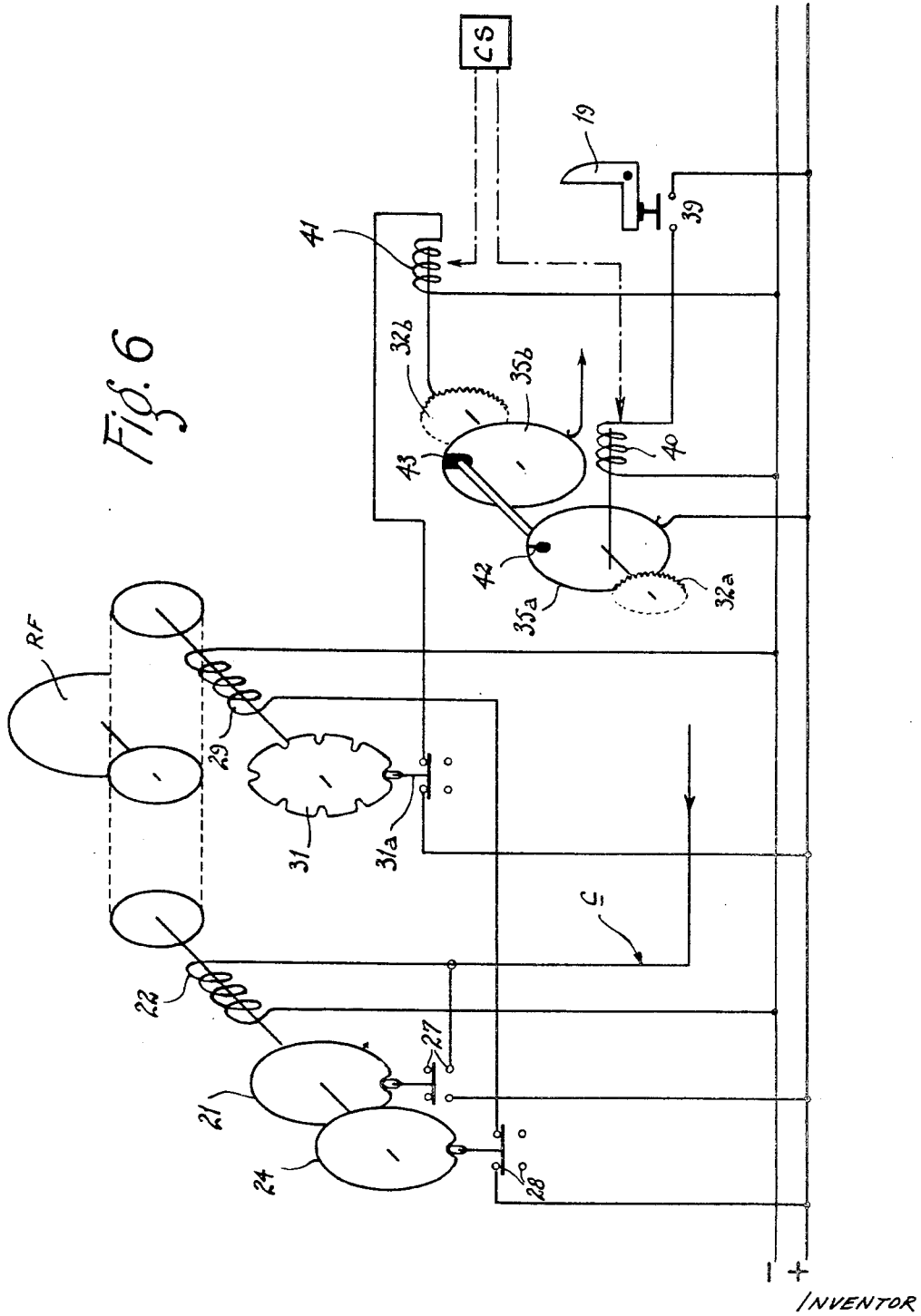

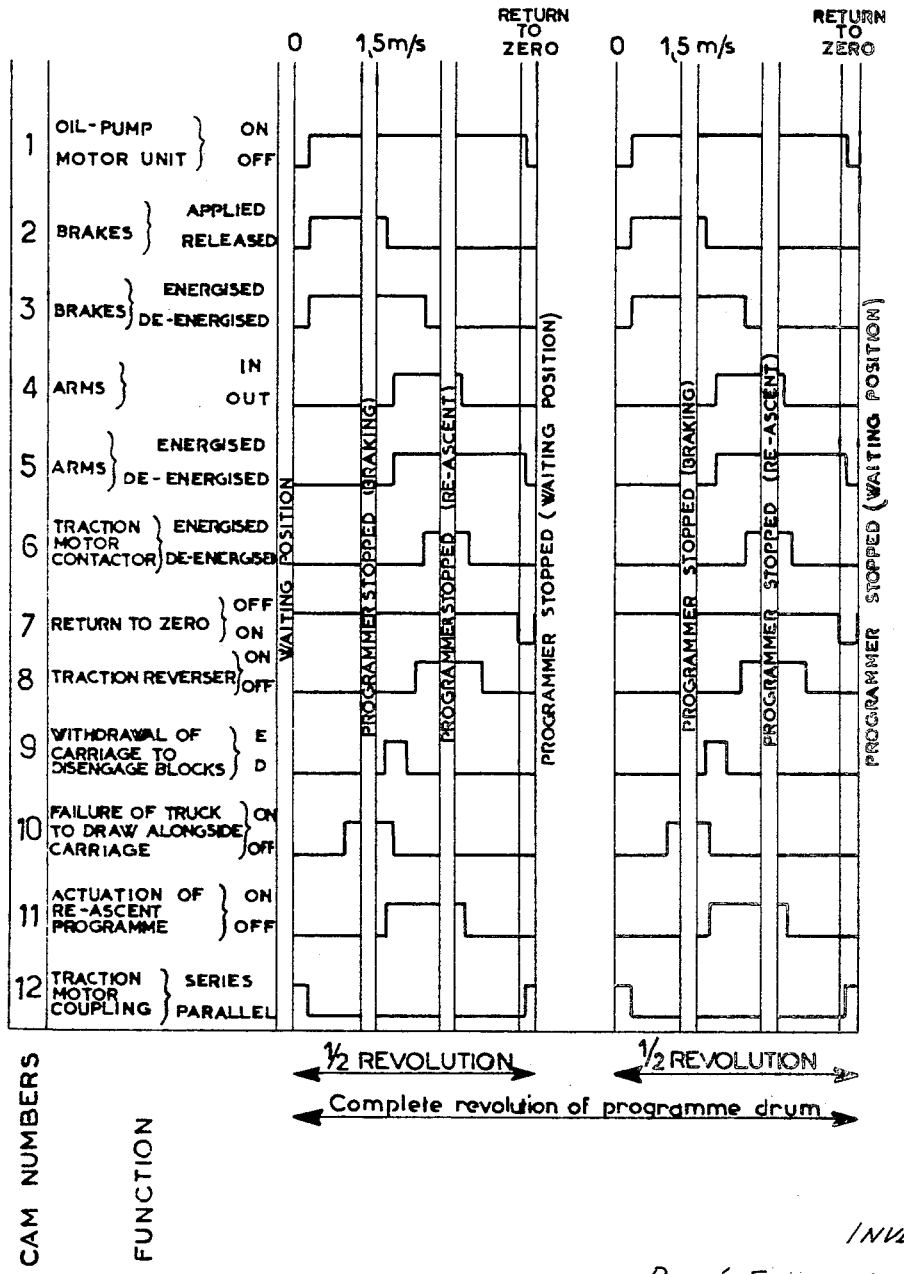

United States Patent Office 3,398,276
Patented Aug. 20, 1968

3,398,276
MARSHALLING YARD APPARATUS
René Edouard Dine, 20 Blvd. Diderat,
75 Paris 12eme, France
Filed May 27, 1965, Ser. No. 459,388
Claims priority, application France, May 28, 1964,
976,153
15 Claims. (Cl. 246—182)

ABSTRACT OF THE DISCLOSURE

Apparatus for slowing railway rolling stock to a predetermined speed comprises a low carriage that runs on auxiliary rails between the standard rails. Arms mounted on the carriage are oppositely laterally outwardly extensible and retractable over the standard rails, for engagement by the wheels of the truck to be slowed. Upon the approach of the truck, the carriage is driven in the same direction, after which the truck wheels contact the laterally extensible members to propel the carriage with the truck. The carriage then applies brakes to its auxiliary rails to slow both the carriage and the truck to a predetermined speed, after which the laterally extensible members are retracted to permit the truck to continue at that low speed. The carriage brake is released and its drive reversed, and the carriage automatically returns to a position to engage the next truck.

---

The present invention concerns the handling of railway rolling stock in marshalling yards.

In a known method the trucks to be shunted are placed in a group of converging sidings ending in a block of single track. The block of track climbs a hillock or "mound" and runs down the slope on the other side, where it is subdivided into a second group of sidings.

The lift of trucks (i.e. the group of trucks forming a train or sub-unit of a train) to be shunted is pushed up the mound and the sections into which the lift is to be divided, consisting of one or more trucks, run down the other side by gravity and are shunted into one of the sidings, to join a stationary lift of trucks to which they are to be connected.

The trucks must travel at an adequate speed, since if they stop prematurely they have to be pushed by hand to the stationary lift. In an effort to avoid premature stopping they are often driven at an excessive speed, which produces shocks upon impact involving breakage and damage to the freight and rolling stock.

In practice such shocks are diminished by placing braking or "skid" blocks or shoes on the track by hand in order to reduce the speed of the trucks shortly before they meet the lift. Putting down the skid shoes by hand is a difficult task and not without danger, and the workers responsible for the operation are not always able to judge the appropriate time for putting the shoes in position.

The present invention aims to avoid these disadvantages. It envisages an apparatus for shunting trucks or the like, enabling lifts of trucks to be formed with complete safety for the workers and without any danger of material damage.

To this end it is proposed, according to the invention, to bring a truck into contact with a stationary lift at a speed within a predetermined range, for example lower than 1.50 metre per second.

Given a truck of any weight and thus of any axle load, its initial speed at the bottom of the mound being within a known range, then if the truck is connected to the truck control apparatus forming the subject matter of the present invention by means of roller blocks this will enable the truck to decelerate under the desired conditions.

In the process here envisaged the point of application in the direction of truck travel of a braking block used to bring the truck to a predetermined speed at a suitable point can be selected easily and determined with sufficient precision.

In a braking apparatus according to the invention such blocks are mounted on a moving self-propelling carriage which travels along a track parallel to the siding and preferably disposed between the rails of the latter. The carriage may, if appropriate, be remote controlled, thereby facilitating the positioning of the blocks at the chosen point of attack according to the length of the section to be braked.

In an advantageous embodiment of the invention the blocks are laterally retractable so that they can be moved aside in front of the axle to which they are applied. The shoes are freed by special controls and withdrawn before the truck stops; this is a novel and considerable advantage which makes it possible to free the truck at a constant starting speed while retaining control over braking. This possibility does not exist when the shoes are put in position by hand. In the latter case the shoes cannot be removed from the line until after the truck has stopped, whether it was stopped by striking the truck at the rear of the stationary lift or whether it came to a halt before it could cover the distance separating it from the lift.

Remote controls for the carriage and blocks may be associated with any distance marks or the like or with any appropriate signals such as velocity signals; this enables various other improvements to be made to the shunting operations and makes it possible to envisage their complete automation.

These improvements and other features and advantages of the invention will emerge from the description which will not be given of one of its embodiments. This has been chosen as a non-restrictive example and is illustrated in the accompanying drawings, in which:

FIGS. 1a and 1b, joined along the line L, form a diagrammatic plan view of a braking carriage according to the invention, FIG. 2 is a cross section through the track along the line II—II in FIG. 1a.

FIG. 3 is a cross section through the carriage along the line III—III in FIG. 1a.

FIG. 6 is a diagrammatic view of a subtraction device and

FIG. 7 is a programming table.

Figure 3:
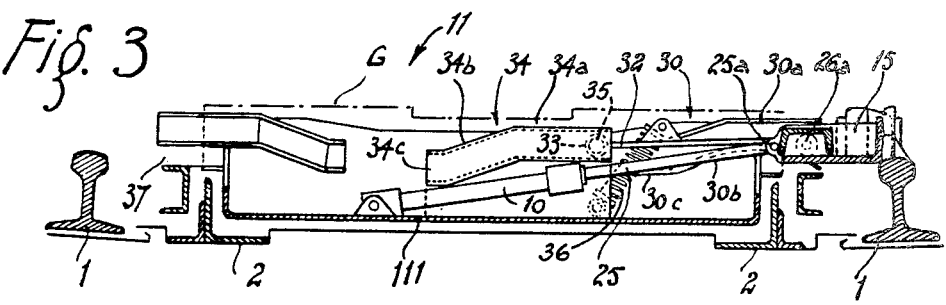
Figure 4:
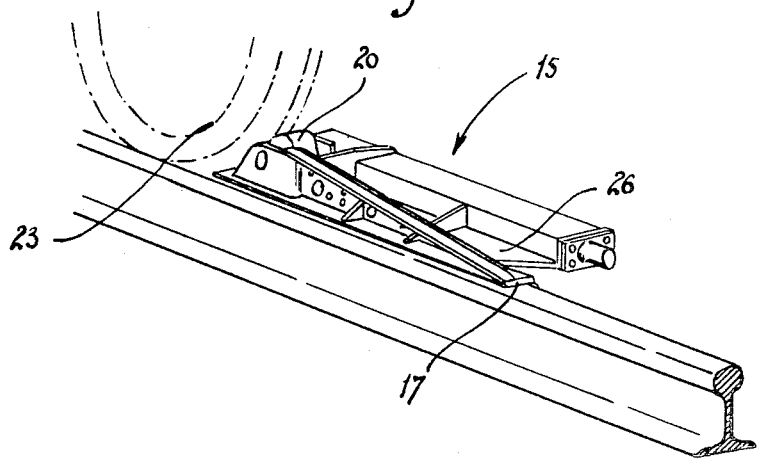
FIG. 4 is a perspective view of a skid block.

Refering now to FIG. 1, this shows a normal railway track 1, 1 inside which there is installed a runway 2, 2, for example formed by angle members fixed to the ties of the track. The runway, which also serves as electrical supply and return conductors, supports an electrically driven carriage having traction motors 3 and negative and positive sliding contacts or collecting shoes 4 and 5. The motors 3 drive the rubber-tyred wheels 6 of a driving carriage 7, which also carries an electrical indicating and control apparatus to which further reference will be made later.

In the FIG. 1 diagram supporting wheels are indicated at $a$, articulations at $b$, jaw brakes at $d$, bevel gears at $e$ and flexible couplings at $f$.

The driving carriage is guided laterally between the vertical limbs of the angle members 2 by rubber-covered wheels 9 rotating in a horizontal plane.

A braking carriage 11 for connection to the railway truck to be moved (or being moved) comprises a platform 111 which is linked with the driving carriage 7 by a flexible and resilient coupling.

The flexible coupling is made up of two sets of coil springs 14 guided by bars 12, and a hydraulic shock absorber 8 resting on the cross bar 13 of the braking carriage 11.

A pair of roller blocks 15 intended to be extended to engage the wheels of the truck being braked as will be later explained, and shown diagrammatically at the front end of the carriage 11 (i.e. at the end remote from an approaching truck), are controlled by double-acting hydraulic rams 10. These roller blocks constitute drive members capable of being placed on a rail of a siding to which the trucks are being shunted in a working position thereby to drive the carriage 11 under the impetus of a truck. The drive members can be withdrawn from the rail and returned to a rest position.

The oil required for operation of the rams and of all the other devices on the carriage is provided by a high pressure pump HP driven by an electric motor HM.

The pump-motor unit HP-HM is associated with a group of electro-hydraulic valves indicated at 16, whose operation is controlled by the programmer as will be described later herein.

The roller blocks 15 and the arms 32 made of metal by which they can be extended are shown in FIG. 3 in the extended position, in which the carriage is driven by the trucks being shunted.

In this example each of the blocks is formed by a runner 17 sliding along the head of the rail.

The runner supports a frustoconical roller 20 with a horizontal axis, the small surface of which faces towards the outside of the track and which is designed to make contact with the flange of the wheel 23 to connect the carriage to the truck.

The set of double-acting hydraulic rams 10 associated respectively with the two blocks 15 serves to put the latter simultaneously into the extended or operating position, for which they are pushed outwardly and placed on the rails 1, or into the retracted or rest position, for which they move in the opposite direction inboard of the carriage 11.

The pistons 25 of the rams 10 are connected by a universal joint 25a to a support 26 for the block 15.

A coil spring 36 (FIG. 3) attached by articulated connections at its two opposite ends to the arm 32 and to the base plate of the carriage 11 keeps the ends of the ferrules 35 and 26a in contact with the lower sliding or rolling tracks of the guides 30 and 34 during the processes of extending and retracting the block supports 26.

It will be seen from FIG. 3 that these sliding or rolling tracks each comprise two horizontal portions 30c, 34a, 34c with an intermediate slope 30b, 34b, the upper horizontal portions 30a, 34a corresponding to the positioning of the block on the head of the rail and the lower horizontal portions 30c, 34c enabling the block to be placed below the maximum depth of ordinary traffic indicated at G (i.e. below the normal lowermost part of standard trucks or carriages) so that the carriage can travel below any rolling stock.

In a specific example of a braking carriage according to the invention at present in use, the available space between the level G and the top of the ties is about 19 centimetres, the total length of the carriage being of the order of 10 metres.

The lower tracks of the guides 30, 31 end on the outside in a descending slope shown at 37 in FIG. 3. These lower tracks are arranged at a height to ensure that the block 15, in approaching the rail upon being extended, is not in danger of striking the edge of the head of the rail in spite of the unevenness with which the angle members 2 may in practice be arranged in relation to the rails 1. As soon as the ends 26a of the block support 26 enter the zone occupied by the slopes 37, the support 26 descends under the action of the spring 36 until the block is applied to the rail.

Figure 5:
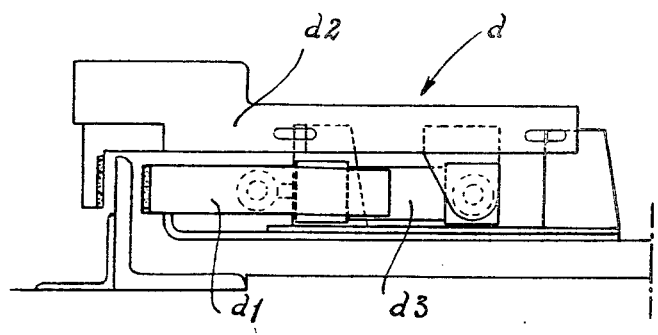
FIG. 5 is a view in elevation of a carriage brake.

The brakes d (FIG. 5) rigidly connected to the carriage serve to brake the latter by gripping the angle members 2 of the inner runway. In an embodiment of the invention now in operation the carriage brakes are of the type shown in FIG. 5 comprising two jaws d1 and d2 which come into action successively; the jaw d1 is first applied to the inner vertical face of the angle 2, then serves as a fixed support for the ram d3, which continues its action and applies the jaw d2 to the outer face of the angle.

Mechanical sensing members 18 (FIG. 1b) mounted on the carriage 7 so as to face approaching trucks, are adapted to come into contact with the latter and close a circuit to cause a motor MP to start; the motor MP serves to drive a programmer P which provides a programme of operations shown in the table in FIG. 7.

The carriage 7 includes a counting-and-substracting device CD (FIGS. 1a and 6) and a manual control CM (FIG. 1b).

The programmer P may be of any suitable type currently in use. In a carriage at present in service in sidings, the programmer is of the cams and drum type and provides a complete operating cycle for every half revolution. The programmer comprises control means MC (FIG. 1b) which enable it, with the aid of circuits (not shown) of the current type, to control the various members of the carriage and in particular the pump-motor unit HP-HM, the brakes d, the rams 10 for actuating the roller blocks 15, and the traction or locomotion motors 3 of the carriage 7. The programmer further comprises control means MA (FIG. 1b) causing it to start or stop in response to the incorporated programme and/or by the action of various elements such as the sensers 18, a pick-up (tachometer or tacho-generator) T for the speed of a carriage (FIG. 1b) and the subtraction device shown in FIG. 6. The tacho-generator T functions as a velocity sensing device and may be of a conventional type of speed-responsive brake control as in U.S. Patent No. 2,939,973. The hydro-electric controls are also conventional as in U.S. Patents Nos. 3,178,886 and 3,239,087.

A ground control CS (FIG. 6) installed, for example, in a central post, makes it possible to act on the subtraction device as explained below; it may serve to actuate any members of the carriage in known manner from this post.

It should be specified however that in this embodiment of the invention the carriage is designed so that it can be virtually independent of any ground control and so that it follows a predetermined cycle by the action of a single source of current in response to the passage of the trucks.

Operation of the apparatus will now be described.

The carriage is parked on its runway 2 in a siding, a suitable distance away from the last truck in the lift being formed. The blocks 15 are placed in the rails in the positions shown in FIGS. 1a and 3.

A truck shunted onto this siding comes into contact with one of the sensors 18 of the carriage 7, with the result that the latter starts moving in the same direction as the truck, thereby reducing the relative speed between the truck and the carriage.

The truck continues on its way and comes into contact with the roller blocks 15 after having bumped the stop blocks 19, moving them inwardly to the position shown by chain-dotted lines in FIG. 1a. The wheels of the first axle of the truck are thus imprisoned between the roller blocks 15 and the bumper blocks 19: the connection between the truck and the carriage is thus established.

The jaw brake device d is simultaneously engaged and the braking pressure increases continuously to a predetermined maximum.

When the speed of the whole assembly decreases and crosses the 1.5 metres per second threshold, for example, the programmer P successively causes the braking action to stop, the block-supporting arms 32 to be retracted and the carriage to withdraw.

Once freed from the carriage, the truck continues its movement at 1.5 metres per second until it makes contact with the lift being formed.

During this time the carriage withdraws towards the disconnecting (shunting) mound by a distance equal to the sum of:

(1) The braking distance which the subtraction device allows to be restored as described below and (2) The mean length of the truck or of the group of trucks forming the section which has just been braked: this distance is obtained by multiplying 5 metres (mean length per axle of SNCF rolling stock) by the number of axles. The number of axles is counted by a bump-receiving electromechanical device installed on the carriage.

In this way the carriage is returned to the same distance as before from the new front of the lift.

Once this point is reached the programmer P causes the carriage to stop, and the block supporting arms to start moving and return the blocks 15 to the head of the rail. The carriage is then ready to receive a further section of trucks to be braked.

The programmer P controls the various operations in the desired order and within the time required for safety. In this connection please see FIG 7. From the waiting position, it, the programmer) starts up as soon as the truck touches the sensers 18 in front. Its starting controls that of the motors and causes the carriage to move away, for example for six seconds, then the jaws to grip (provided that the truck has effectively touched the blocks), after which the programmer stops during the braking period. As soon as the speed of the whole assembly has dropped to a predetermined value such as 1.5 metres per second the programmer starts up again by the action of a tacho-generator or tachometer connected to the carriage wheels and controls the following operations: the release of the jaws, withdrawal of the carriage to help disengage the blocks, the retraction of the blocks, and arms, the reversal of the direction of travel and starting of the traction motors to return the carriage. When the traction motors have started the programmer stops.

The programmer is then started again for the last phase motors, extending the arms and returning to zero.

This phase includes the stopping of the motors, the extension of the arms and the return of the programmer to zero.

If after touching the sensers the truck should fail to reach the blocks, the carriage will continue to move away and finish its programme immediately by retracting the arms, re-ascending the shunting mound, stopping the motors, extending the arms and returning to zero.

The speed of the truck or group of trucks at the bottom of the mound, or the speed before braking, must remain within a known range, this range forming one of the given factors in the problem. For this purpose mound brakes (i.e. fixed brakes mounted beside the rails on the mound) can be used and the truck speed can be regulated manually or automatically.

In addition to the automatic movement of the carriage as described when the sections to be braked consist of one or two trucks, correction of the waiting point (i.e. the point to which the carriage is returned to wait) is necessary when the section to be braked is larger. To take an example, if the lift to be braked is made up of ten trucks the carriage will have to re-ascend a distance calculated in advance and shown on a range table. This field correction will be made by means of a remote control: a push button installed in the central post will enable impulses to be emitted to control the re-ascent every 5 metres, the impulses being added to those recorded by the carriage during the counting of the axles. The impulses can be sent out during the braking movement or the withdrawing movement of the carriage.

The manual control CM on the carriage enables the block supporting arms to be moved in and out to give passage, for example to an engine running light, and to make the carriage advance or withdraw so as to bring it into a favourable position, for example following an uncoupling operation. If appropriate, these operations can be carried out by a ground control from the permanent post.

It has been mentioned that the starting of the traction motors to return the carriage towards the uncoupling mound was controlled by retraction of the block supporting arms 15, and that these motors were stopped when the carriage had covered a distance equal to the sum of the path travelled during braking plus the length of the truck or section which had just been braked.

The distance covered during braking is counted and deducted by the device shown in FIG 6; this is installed on the carriage and comprises an electromagnetic clutch 22 which is driven by a free-running wheel RF of the carriage. The clutch 22, which is energised by the conductor c as soon as the truck has touched one of the sensers 18 of the carriage, interlocks the wheel RF with two cams 21, 24 controlling the contacts 27 and 28 respectively.

As soon as its cam 21 starts rotating, the contact 27 is made and energises the coil of the clutch 22 holding it engaged.

The contact 28, which supplies the clutch of the subtracting device for deducting the length of the lift of trucks, is broken as soon as its cam 24 starts rotating.

The carriage may travel any distance in braking and, by means of the above device, makes the cams 21 and 24 pass through an angle proportional to such distance.

When the carriage returns towards the mound the device, still connected to the wheel RF by the clutch 22, turns in the opposite direction, reverses the motion of the cams and restores them to their original position.

This position is reached when the carriage comes to the point where it was previously waiting.

At this moment the contact 27 is broken and cuts off the energising current to the clutch 22, thereby disconnecting the cams 21 and 24 from the wheel RF.

The contact 28 simultaneously closes and energises the clutch 29 of the cam 31, which serves to deduct the length of the section braked, as described below:

Impulses are emitted by the contact 31a of this cam at the rate of 1 impulse per 5 metres covered by the carriage. These impulses act on a second subtracting device made up of two ratchet wheels 32a and 32b interlocked with insulated drums 35a and 35b carrying a conductive ring on the outside.

The ratchet wheels are each driven by an electro-magnet 40 and 41.

The drum 35a carries a contact lug 42 which, when opposite the contact 43 of the drum 35b, establishes a circuit (not shown) supplying a trip switch or the like for stopping the traction motors.

This device operates as follows:

Each time a truck wheel passes a bumper block 19 the latter establishes the circuit supplying the electro-magnet 40, with the aid of an end-of-stroke contact 39, thereby providing an impulses per axle; the electro-magnet 40 makes the ratchet wheel 32a advance by one tooth and so on, one tooth for every axle counted.

The drum 35a is thus displaced by a given angle.

Moreover, independently of the movement of the drum 35a, the drum 35b is acted on in the same rotary direction by the ratchet wheel 32b; this is controlled tooth by tooth by the electro-magnet 41, which receives its impulses from the subtracting cam 31 (in the embodiment disclosed, one impulses per five metres covered).

With this device included the carriage is entirely automatic: that is to say, as well as automatic braking and the liberation of the trucks at a constant starting speed, after each braking operation the carriage is returned to a constant distance from the front of the lift being formed.

In order to vary the position of the carriage on the ground from the central post it is possible to act on the axle counting and subtracting device.

For this purpose the control CS in the central post, comprising a push button and a reverser, enables alternating current impulses to be sent out at two different frequencies, one for forward movement and one for backward movement into the transporting rails.

These impulses are picked up by the current collectors 4 and 5, filtered and then rectified to actuate the electromagnets 40 and 41 controlling the ratchet wheels. Each impulses alters the position of the ratchet wheels by one tooth, corresponding to a predetermined distance (e.g. 5 metres) travelled in one direction or the other, according to the frequency.

The remote manual adjustment can be made when the carriage has stopped, so that it corrects its final position in its first movement, or while it is moving.

I claim:

1. Apparatus for reducing the speed of railway rolling stock, comprising a carriage, wheels mounting the carriage for movement parallel to a railroad track, an extensible and retractable member mounted on the carriage, means mounted on the carriage for extending said member transversely of the path of movement of the carriage into a position in which it can be contacted by railway rolling stock to propel the carriage parallel to the track, brake means mounted on the carriage for slowing the carriage and the railway rolling stock that propels the carriage, means mounted on the carriage for sensing the speed of the carriage, and means responsive to the sensing means to release said brake means when the carriage is slowed to a predetermined speed.

2. Apparatus as claimed in claim 1, and drive means mounted on the carriage for propelling the carriage, means for detecting the approach of railway rolling stock toward the carriage, and means responsive to said detecting means to actuate said drive means to propel the carriage in the same direction as the direction of movement of the approaching railway rolling stock thereby to reduce the speed of the approaching railway rolling stock relative to the carriage.

3. Apparatus as claimed in claim 1, and means responsive to said sensing means to retract said member out of contact with the railway rolling stock when the carriage is slowed to said predetermined speed.

4. Apparatus as claimed in claim 3, and means responsive to said sensing means to actuate said drive means to propel the carriage in the direction opposite the direction of movement of the railway rolling stock and to return the carriage to a position for contact with further railway rolling stock.

5. Apparatus as claimed in claim 4, the distance over which the carriage is returned being about equal to the distance the carriage traveled in the same direction as the railway rolling stock.

6. Apparatus as claimed is claim 4, the distance over which the carriage is returned being about equal to the distance the carriage traveled in the same direction as the railway rolling stock plus the total length of said railway rolling stock.

7. Apparatus as claimed in claim 1, said member being extensible into the path of a wheel of the railway rolling stock and having an antifriction roller thereon engageable by said wheel.

8. In combination with a length of railroad track comprising a pair of rails, a plurality of auxiliary rails disposed between said railroad track rails, and a low carriage mounted on said auxiliary rails for travel between and parallel to said railroad track rails, a pair of oppositely extensible and retractable members mounted on the carriage, means mounted on the carriage for simultaneously extending said members transversely of the path of movement of the carriage into a position in which they are disposed over said railroad track rails to be contacted by railway rolling stock on said railroad track rails to propel the carriage along said auxiliary rails, brake means mounted on the carriage for slowing the carriage and the railway rolling stock that propels the carriage, means mounted on the carriage for sensing the speed of the carriage, and means responsive to said sensing means to retract both of said members out of contact with the railway rolling stock when the carriage is slowed to a predetermined speed.

9. Apparatus as claimed in claim 8, said brake means being frictionally engageable with said auxiliary rails to slow the carriage and the railway rolling stock that propels the carriage.

10. Apparatus as claimed in claim 8, and drive means mounted on the carriage for propelling the carriage, means for detecting the approach of railway rolling stock toward the carriage, and means responsive to said detecting means to actuate said drive means to propel the carriage in the same direction as the direction of movement of the approaching railway rolling stock thereby to reduce the speed of the approaching railway rolling stock relative to the carriage.

11. Apparatus as claimed in claim 8, and means responsive to said sensing means to release said brake means when the carriage is slowed to said predetermined speed.

12. Apparatus as claimed in claim 11, and means responsive to said sensing means to actuate said drive means to propel the carriage in the direction opposite to the direction of movement of the railway rolling stock and to return the carriage to a position for contact with further railway rolling stock.

13. Apparatus as claimed in claim 12, the distance over which the carriage is returned being about equal to the distance the carriage traveled in the same direction as the railway rolling stock.

14. Apparatus as claimed in claim 12, the distance over which the carriage is returned being about equal to the distance the carriage traveled in the same direction as the railway rolling stock plus the total length of said railway rolling stock.

15. Apparatus as claimed in claim 8, said members being extensible into the paths of the wheels of the railway rolling stock and having antifriction rollers thereon engageable by said wheels.

References Cited

UNITED STATES PATENTS

| | | |
|---|---|---|
| 1,556,500 | 10/1925 | Deloison et al. |
| 3,015,724 | 6/1962 | Jefferson. |

ARTHUR L. LA POINT, *Primary Examiner.*

S. T. KRAWCZEWICZ, *Assistant Examiner.*